US007826425B2

(12) United States Patent
Sekhar

(10) Patent No.: US 7,826,425 B2
(45) Date of Patent: Nov. 2, 2010

(54) METHOD AND SYSTEM FOR LOSS-LESS ROAMING WITH WIRELESS BRIDGING

(75) Inventor: Ramesh Sekhar, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1039 days.

(21) Appl. No.: 11/495,448

(22) Filed: Jul. 28, 2006

(65) Prior Publication Data
US 2008/0025271 A1 Jan. 31, 2008

(51) Int. Cl.
*H04W 4/00* (2009.01)
(52) U.S. Cl. ............... 370/331; 370/338; 370/332; 370/390; 455/574; 700/275; 700/26
(58) Field of Classification Search ........... 370/331, 370/338, 332; 455/574; 700/275, 26
See application file for complete search history.

(56) References Cited

U.S. PATENT DOCUMENTS

| 4,688,183 | A | * | 8/1987 | Carll et al. | ............. | 700/275 |
| 6,125,279 | A | * | 9/2000 | Hyziak et al. | ............. | 455/445 |
| 6,363,267 | B1 | * | 3/2002 | Lindskog et al. | ............. | 455/574 |
| 7,457,267 | B1 | * | 11/2008 | O'Neill | ............. | 370/331 |
| 2006/0002350 | A1 | | 1/2006 | Behroozi | | |
| 2006/0083201 | A1 | | 4/2006 | He et al. | | |

FOREIGN PATENT DOCUMENTS

| EP | 1 443 715 | 8/2004 |
| EP | 1 601 221 | 11/2005 |

OTHER PUBLICATIONS

Stallings, "IEEE 802.11: Wireless LANs from a to n," Sep. 2004, IT Professional, IEEE Service Center, Los Alamitos, vol. 6, No. 5, pp. 32-37.

* cited by examiner

*Primary Examiner*—Rafael Pérez-Gutiérrez
*Assistant Examiner*—Nimesh Patel

(57) ABSTRACT

Described is a method for transmitting a voice packet from a first access point ("AP") to a mobile unit ("MU"), forwarding the voice packet from the first AP to a second AP when acknowledgement of receipt of the voice packet is not received by the first AP and transmitting the voice packet from the second AP to the MU. Also, a system having a first access point ("AP") transmitting a voice packet to a mobile unit ("MU") and forwarding the voice packet when acknowledgement of receipt of the voice packet from the MU is not received by the first AP and a second AP receiving the forwarded voice packet from the first AP and transmitting the voice packet to the MU.

6 Claims, 3 Drawing Sheets

METHOD AND SYSTEM FOR LOSS-LESS ROAMING WITH WIRELESS BRIDGING

FIELD OF THE INVENTION

The present invention generally relates to the roaming of mobile units in a wireless network handling voice communications.

BACKGROUNDS

As the technology supporting digital Voice over Internet Protocol ("VoIP"), or Internet-based telephony, continues to increase, VoIP communication has become a viable alternative to standard telephone services. Furthermore, there is a demand to combine the use of wireless Internet networks, such as a Wireless Local Area Network ("WLAN"), with VoIP communication in order to provide wireless VoIP communication. While wireless Internet has expanded to provide data communications between wireless devices, the introduction of wireless VoIP requires seamless transmission of voice communications between wireless Internet networks. Thus, wireless VoIP may provide a user of a VoIP-enabled device, or Mobile Unit ("MU"), to make and receive calls over a wireless network while the user is within the range of an Access Point ("AP") of a WLAN. However, as a user moves from one AP to another, problems may arise in maintaining the integrity of the wireless voice communications within the IP network.

In any wireless communications, the term roaming may be used to describe the extension of service to a MU in motion from one AP to another AP. When a wireless user roams within a covered region during a call session, a network switch may transfer, or handoff, the MU between APs. A handoff may occur if the MU moves out of range of a current AP and can receive a stronger signal from a neighboring AP. In addition, a handoff may occur if the current AP has reached a servicing capacity and the neighboring AP is available for service. However, as a MU is handed-off from one AP to the next, portions of the digitized voice data may be lost during the transition.

SUMMARY OF THE INVENTION

A method for transmitting a voice packet from a first access point ("AP") to a mobile unit ("MU"), forwarding the voice packet from the first AP to a second AP when acknowledgement of receipt of the voice packet is not received by the first AP and transmitting the voice packet from the second AP to the MU. The method may also include retransmitting the voice packet from the first AP to the MU a predetermined number of times prior to forwarding the voice packet to the second AP.

A system having a first access point ("AP") transmitting a voice packet to a mobile unit ("MU") and forwarding the voice packet when acknowledgement of receipt of the voice packet from the MU is not received by the first AP and a second AP receiving the forwarded voice, packet from the first AP and transmitting the voice packet to the MU.

A device having a receiving module receiving a voice packet, a transmission module transmitting the voice packet to a mobile unit ("MU"), a verification module verifying if the MU acknowledged receipt of the voice packet and a forwarding module forwarding the voice packet to a neighboring device if the MU failed to acknowledge receipt of the voice packet.

DETAILED DESCRIPTION

Figure 1:
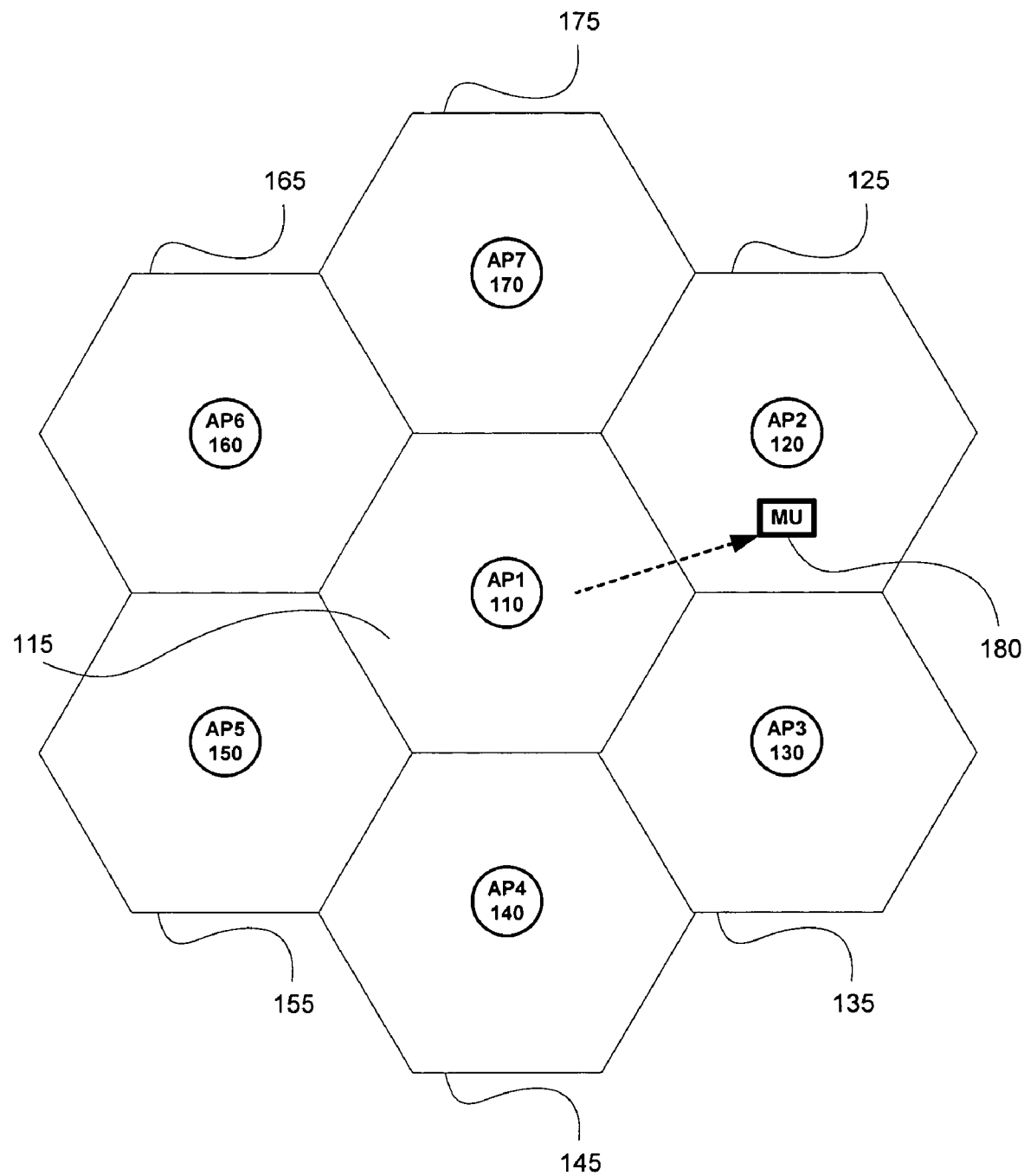
FIG. 1 shows an exemplary system for loss-less roaming with wireless bridging according to the present invention.

The present invention may be further understood with reference to the following description of exemplary embodiments and the related appended drawings, wherein like elements are provided with the same reference numerals. The present invention is related to systems and methods used for achieving loss-less roaming in a wireless communication architecture. Specifically, the present invention is related to systems and methods for minimizing a packet exchange during a roam, wirelessly bridging packets during the roam from a first Access Point ("AP") to a second AP, and virally bridging packets to Mobile Units ("MUs") that have gone out of range. Thus, the exemplary embodiments of the present invention may provide seamless VoIP communications while roaming between multiple APs. Furthermore, the present invention allows for improved Quality of Service ("QoS") for VoIP communications while maintaining a high level of security.

In order for VoIP to be possible, the audio input, or voice data, must be digitized (or "packetized") for transmission within an IP network. This process involves the compression and separation of the voice data into short digital audio packets, for example, on the order of 10 to 30 milliseconds. Once the voice data is digitized, it may be transmitted through the IP network towards a predetermined destination. However, during the transmission, a number of packets may fail to reach the destination or may not arrive in proper sequence. The failure of one or more packets to reach the destination over a computer network may be termed "packet loss." Packet loss may be caused by a number of factors, such as signal degradation, network links operating at maximum capacity, corrupted packets, defective networking equipment, etc. With regards to voice data, packet loss may result in transmission interruptions such as voice dropout, distorted audio (e.g., transmission hiccups), loss of connectivity, or simply degradation of voice quality.

The likelihood of packet loss may drastically increase as a MU roams from one AP to another AP. The typical roam on an encrypted link takes about 20 to 50 milliseconds, and possibly longer within wireless switch architectures. Several packets of voice data may be lost during this interval, especially in wireless switch architectures that have high latency Layer-Three ("L3") tunnels between the switch and the APs. L3 routing allows for data traffic from wireless clients to be encapsulated in encrypted L3 tunnels. However, the storing and retransmitting of these lost packets to another AP after the roam is not a viable solution.

One solution to the packet loss during a roam would be not to roam at all. This may be accomplished through the use of a single channel over a single Basic Service Set ("BSS"). A BSS may be defined a set of wireless stations in communication with each other through an AP. In other words, the AP serves as a master to control the wireless stations within the BSS, wherein each wireless station shares a service set identifier ("SSID"). In order to eliminate roaming, a single-BSS network essentially creates a coverage area that is covered by a single AP. However, the problem with this solution is that a very low latency link is required between the switch and the APs. This low latency requirement is derived from the need to finely coordinate the beacon going out of multiple "ultra-thin" APs to prevent confusion among the MUs regarding the beacon timings and power save polling ("PSP") bit mask settings. Thus, an L3 link is not compatible due to the high latency of L3 tunnels.

According to an exemplary embodiment of the present invention, an infrastructure is provided that eliminates packet loss during roaming while being independent of the tunnel that is used between the switch and the APs. It is important to note that the difficulties in roaming are primarily centered on packet loss problems, and not centered on latency problems. Latency may be defined as the delay in time between the transmission of a data packet from a origin of a communication link and the reception of that data packet at a destination of the communication link. From an application point of view, specifically voice applications (e.g., VoIP), there is no difference between a zero latency roam and a 20-millisecond roam with zero lost packets. Any jitter of this magnitude (<60 ms) is easily taken care of by the jitter buffer on the voice clients.

FIG. 1 shows an exemplary network, for example a wireless VoIP network 100, for loss-less roaming with wireless bridging for VoIP communications according to the present invention. The system 100 may be a wireless VoIP switch infrastructure that includes a wireless switching device (not shown) as well as a plurality of APs, namely AP1 110-AP7 170, wherein each AP has a respective coverage area 115-175. Those skilled in the art will understand that the present invention does not need to be implemented on a network including a wireless switch. That is, the present invention may be implemented on any network that is capable of handling VoIP or other packetized voice transmissions in accordance with the principles and functionality described herein. Thus, the use of a wireless switch based network is only exemplary.

The wireless switching device may be a robust hardware component that connects the wireless VoIP network 100 to the Internet. The wireless switching device may be responsible for the management of traffic and AP handoffs, as well as the security of the data transferred over the network 100. In other words, the wireless switching device may monitor the status of each of the APs 110-170 in order to detect a failure of an AP or when an AP has reached maximum capacity. Upon such detection, the wireless switching device may route the data traffic via another AP. While not shown in FIG. 1, the wireless switching device may be connected to each of the APs 110-170 via a wired or wireless connection. Again, as described above in other network topologies, these functions may be carried out by other devices.

Each of the APs 110-170 may be in direct communication with the wireless switching device via multiple links, for example, using a high latency, encrypted L3 tunneling protocol. The encrypted L3 tunneling protocol allows for L3 data traffic from wireless clients to be encapsulated in the L3 tunnels between the wireless switching device and the APs 110-170. A tunneling protocol may be described as a network protocol that encapsulates one protocol inside another. Thus, tunneling may be used to transport a network protocol through a network that may be unable to support such a protocol.

A MU 180 may operate within the network 100 to provide a user with wireless VoIP communication services. The MU 180 may be a mobile phone designed to work with wireless Internet networks. It should be noted that while the MU 180 may function within the exemplary network 100, the MU 180 may also operate within a separate standard cellular network thereby allow the MU 180 to have dual modes of operation. Initially, the MU 180 may be situated within the coverage area 115 of the AP1 110. All data packets, i.e., voice data packets, directed to or from the MU 180 may be received or transmitted through the AP1 110 via the wireless switching device. When the MU 180 roams from the coverage area 115 of the AP1 110 to the coverage area 125 of the AP2 120, the wireless switching device may redirect transmission of data packets intended for the MU 180 from the AP1 110 to the AP2 120. Thus, as the MU 180 approaches the boarder of coverage area 115 and enters into coverage area 125, the wireless switching device is able to ensure delivery of the data packets to the MU 180 from the most appropriate AP within the wireless VoIP network 100.

Figure 2:
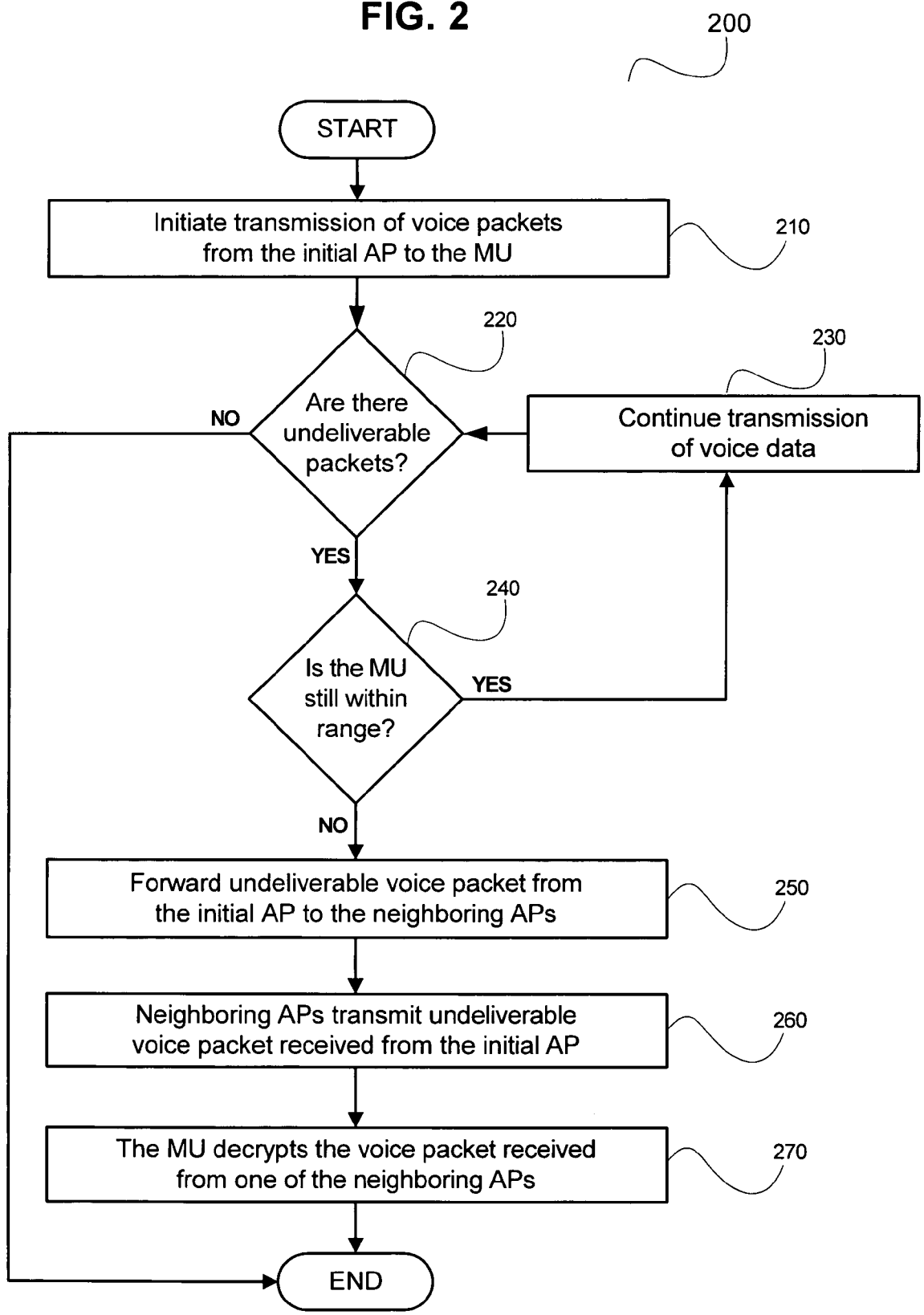
FIG. 2 shows an exemplary method for loss-less roaming with wireless bridging according to the present invention.

FIG. 2 shows an exemplary method 200 for loss-less roaming with wireless bridging for VoIP communications according to the present invention. The exemplary method 200 will be described with reference to the exemplary system 100 of FIG. 1. According to the present invention, the method 200 may provide seamless VoIP transitions for loss-less roaming includes minimizing the data packet exchange during a roam, wirelessly bridging data packets from a initial AP1 110 to a subsequent AP2 120 during a roam, and virally bridging data packets to the MU 180 as the MU 180 travels quietly beyond the coverage 115 of the AP1 110. Furthermore, the exemplary method 200 may also provide for improved QoS for VoIP communications.

In order to minimize the data packet exchange during a roam, the exemplary method 200 may utilize the IEEE 802.11r standard. The 802.11 standards are a set of wireless fidelity ("Wi-Fi") standards established by the Institute of Electrical and Electronics Engineers ("IEEE") in order to govern systems for wireless networking transmissions. IEEE 802.11r may facilitate the development of wireless VoIP over 802.11-enabled phones. Specifically, the 802.11r standard specifies fast handoffs between BSS stations, thereby allows the MU 180 to quickly and seamlessly transition from one AP, AP1 110, to another AP, AP2 120 as the MU 180 is in motion. Thus, the MU 180 must be able to rapidly disassociate from the AP1 110 and associate to the next AP2 120 in order to avoid any detectable delay in data transmission by the user of the MU 180.

Problems such as packet loss may arise when a handoff is required while the MU 180 is actively receiving data packets. When the MU 180 roams from the AP1 110 to the AP2 120 in the middle of a data transfer, data packets intended for the MU 180 may have already reached the AP1 110 by the time the MU 180 has moved beyond the range of the AP1 110. Since the AP1 110 can no longer reach the MU 180, these data packets received by the AP1 110 may effectively become lost packets. The solution provided by the exemplary method 200 allows for loss-less roaming with wireless bridging.

In step 210, the wireless switching device may initiate the transmission of a stream of voice data packets to the MU 180 within coverage area 115 via the AP1 110 of the wireless VoIP network 100. As discussed above, the voice data may be compressed and packetized into packets for transmission to the AP1 110 over a secure L3 tunnel. Upon receiving the voice data packets from the wireless switching device, the AP1 110 may broadcast the packets over the coverage area 115, wherein the MU 180 may start receiving the stream of packets.

However, during the broadcast of the stream of voice packets, the MU 180 may roam beyond the range of coverage area 115 of the AP1 110. Due to the MU 180 being out of range of the AP1 110, there may be a number of voice packets that have been received by the AP1 110 from the wireless switching device but have not been received by the MU 180. In other words, during the stream of packets to the MU 180 via the AP1 110, the out-of-range roam of the MU 180 may have prevented a certain number of packets at the AP1 110 from being transmitted to the MU 180. Thus, these packets may be undeliverable to the MU 180 from the AP1 110. In step 220, the AP1 110 may determine whether there are undeliverable packets intended for delivery to the MU 180. If there are undeliverable packets at the AP1 110, the exemplary method 200 may advance to step 240. Otherwise, when there are no undeliverable packets, the method 200 may terminate.

In step 240, the AP1 110 may verify whether the MU 180 is still within the range of coverage area 115 when there are undelivered packets at the AP1 110. An exemplary process of performing this verification may be repeated attempts to transmit the undeliverable packet to the MU 180. The number of times the transmission is repeated may be a predetermined number, such as five times. Those skilled in the art will understand that the number of retries may be varied to select an optimal number based on various functions such as network topology, site of coverage areas, transmission power, etc.

During each of these repeated transmissions, the AP1 110 may listen for an acknowledgement message from the MU 180. Those skilled in the art would understand that an acknowledgement message may be defined as a notification sent from a receiver to a sender in order to indicate that a packet of data has properly arrived to the destination receiver, thereby acknowledging an error-free transmission of data. If there AP1 110 receives an acknowledgment message, the method may advance to step 230 wherein the AP1 110 continues transmission of packets to the MU 180. If there is no acknowledgement message received by the AP1 110 from the MU 180, the method 200 may advance to step 250.

Due to the failure to receive the acknowledgement message, it may be presumed that the MU 180 has roamed beyond the coverage area 115 of the AP1 110 and that the MU 180 is now within a coverage area of one of the neighboring APs. In step 250, the AP1 110 may forward the undeliverable packet to each of the neighboring APs, AP2 120-AP7 170 when the AP1 110 fails to receive an acknowledgement message on each of the predetermined number of re-transmissions. An exemplary forwarding process may be accomplished forwarding multiple copies of the undeliverable packet and broadcasting each of these copies directly from the AP1 110 to the neighboring APs 120-170. Those skilled in the art would understand that the forwarding process may depend on the network topology of the system 100. While the above referenced forwarding process describes direct communication from the AP1 110 to another AP, an alternate forwarding process may be accomplished via the wireless switching device. According to this alternate forwarding process, the AP1 110 may forward the packet to the wireless switching device, wherein the wireless switching device forwards copies of the packet to the neighboring APs 120-170. Therefore, presuming that the MU 180 is currently within a neighboring coverage area, each of the neighboring APs will now have a copy of the undeliverable packet, including the AP that the MU 180 has actually roamed to, e.g., the AP2 120. Thus, the exemplary embodiment of the present invention may be applicable within a meshed infrastructure, a backbone infrastructure, or any variety of network topologies.

In step 260, each of the neighboring APs 120-170 may transmit their copy of the undeliverable packet. In essence, each of the APs 120-170 may assume the role of the AP1 110 when transmitting the packet, effectively acting as an extension of the AP1 110 for the data traffic that was sent to the AP1 110 but not received by the MU 180. While the AP1 110 may be unaware of which one of the neighboring APs 120-170 that the MU 180 has roam towards, as the MU 180 may have already tuned to the channel of one of these APs. According to this exemplary system 100 and method 200, the MU 180 has entered coverage area 125 of the AP2 120. Thus, the MU 180 may remain tuned to the channel of the AP2 120 once within the coverage area 125.

In step 270, the MU 180 may successfully decrypt the packet transmitted from the AP2 120 via the AP1 110. According to an exemplary embodiment of the present invention, the unicast encryption keys may not change within the wireless VoIP infrastructure. Therefore, method 200 may allow for the packet that was undeliverable to the MU 180 from the AP1 110 to be deliverable from a neighboring AP, specifically, AP2 120. Thus, packets that would have otherwise been lost once the MU 180 roamed beyond coverage area 115 may now be salvaged. Those skilled in the art would understand that method 200 may employ alternate decryption processes. For example, AP1 110 may utilize a distinct encryption key from any of the other APs 120-170 within the wireless VoIP network 100. Under this example, a decryption key may be forwarded together with the undeliverable packet in order to allow the MU 180 to successfully decrypt the packet.

Figure 3:
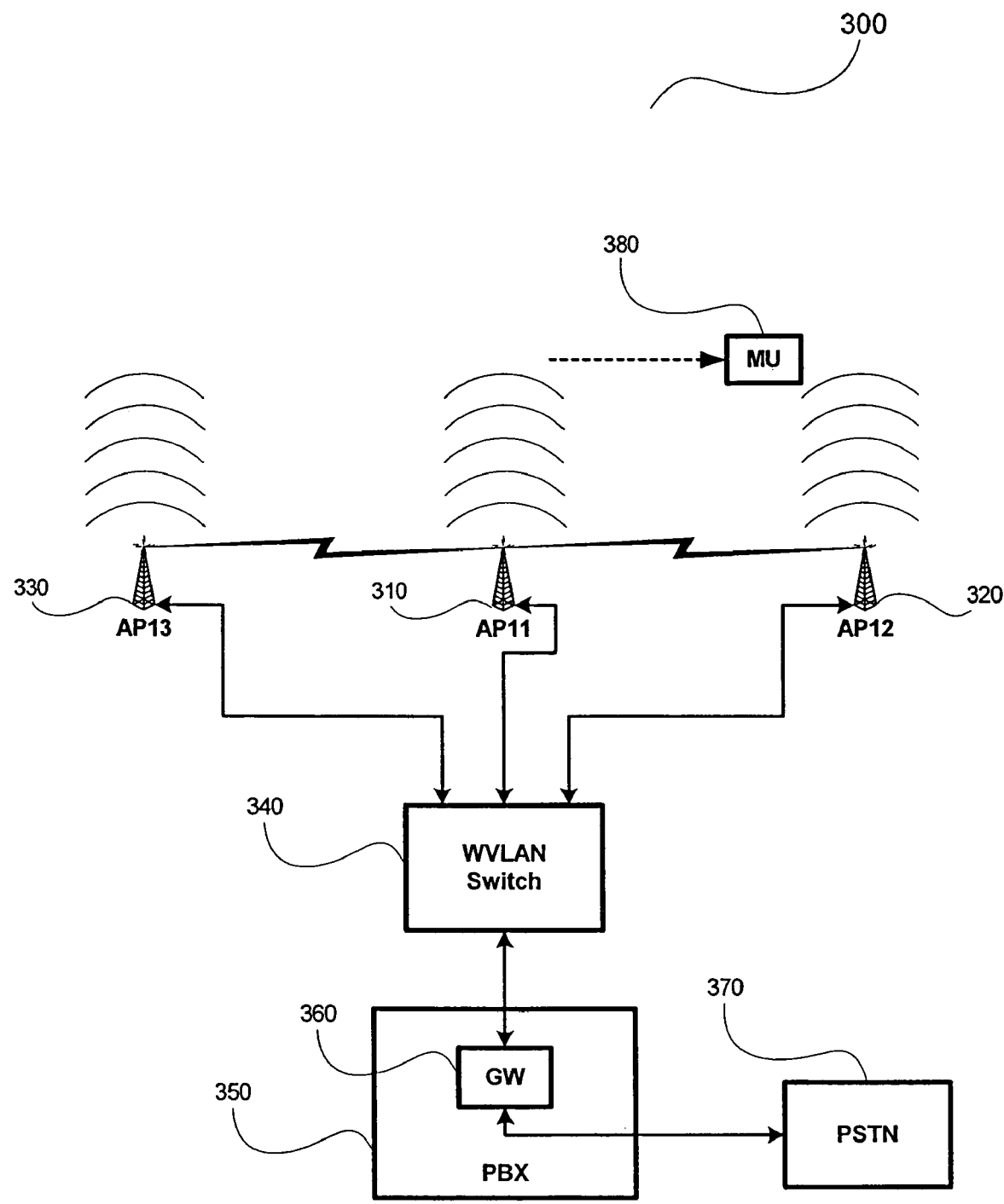
FIG. 3 shows an exemplary embodiment of the system for loss-less roaming with wireless bridging according to the present invention.

FIG. 3 shows an exemplary embodiment of a wireless VoIP infrastructure 300 for loss-less roaming with wireless bridging according to the present invention. According to this embodiment, the infrastructure 300 may be a network having at least three wireless APs, AP11 310, AP12 320, and AP13 330, a wireless voice/data LAN ("WVLAN") switch 340, and a Public Exchange ("PBX") 350 having a VoIP Gateway ("GW") 360 to provide wireless VoIP telecommunications to the MU 380. As described in detail above, the present invention allows for the minimization of the packet exchange during a roam as the MU 380 travels from the initial AP11 310 to the destination AP12 320.

The PBX 350 may be a hardware for controlling the interface between the wireless VoIP infrastructure 300 and a Public Switched Telephone Network ("PSTN") 370, wherein the PBX 350 is connected to the PSTN 370 via a T1 line, or alternatively via an E1 line. The GW 360 may be a component of the PBX 350 for converting voice data from the PSTN 370 into IP data packets, and conversely converting from IP packets to voice data. The WVLAN switch 340 may direct the flow of wireless voice traffic over multiple encrypted L3 tunnels between the APs 310-330 and the GW 360. Specifically, the WVLAN switch 340 may provide the GW 360 with the IP addresses available for reaching the MU 380 via the various APs 310-330. Furthermore, the WVLAN switch 340 may be responsible for the authentication of the wireless communication to and from the VoIP infrastructure 300.

According to an exemplary embodiment, the speed in which the MU 380 is traveling may require rapid handoffs from the AP11 310 to the AP12 320 in order to provide seamless VoIP telecommunication service during an active voice call. Once the MU 380 roams beyond the range of the AP 11 310, certain data packets sent from the GW 360 to the AP11 310 may not reach the MU 380. As described above, the AP11 310 may retransmit these packets for a predetermined number of times. If the AP11 310 fails to verify that the MU 380 has received these packets, the AP11 310 may forward the packets to the AP12 320 and the AP13 330 the AP12 320 and the AP13 330 may then transmit these packets within their respective coverage area for a predetermined number of times. Thus, the MU 380 may be able to receive packets that were sent to the AP11 310 but not transmittable from the AP11 310. By allowing the AP11 310 to forward the non-transmittable packets to neighboring APs, the MU 380 is able to receive packet would have otherwise been lost.

In addition to reducing the number of packet lost within VoIP infrastructure 300 during a roam, exemplary embodiments of the present invention may further serve a mechanism for reducing the number of retransmissions required for a voice data packet to reach the MU 380. There are situations where the MU 380 may be able to clearly hear the AP11 310, however the AP11 310 may not be able to hear the MU 380 (i.e., the AP11 310 may fail to receive the acknowledgement message from the MU 380). Therefore, the reception of certain transmitted packets may not be verified. In such situations, the exemplary embodiments may allow for these unverified packets to be virally bridged to neighboring APs, such as AP12 320 and AP13 330. For example, a typical AP may drop an unverified packet after 15 failed attempts. However, the exemplary infrastructure 300 makes better use of network bandwidth by having the AP11 310 forward the packet to the neighboring APs, AP12 320 and AP13 330, after a lesser number of failed attempts, such as five attempts. Thus, the exemplary embodiment of the present invention may not only reduce the amount of lost packets, it may also reduce the number of retransmissions required in order to verify the successful delivery of the packets.

Furthermore, exemplary embodiments of the present invention may allow for the neighboring APs, AP12 320 and AP13 330, to receive the acknowledgement message from the MU 380. For example, in the scenario where the MU 380 hears the AP11 310 but the AP11 310 is unable to hear the MU 380, the neighboring APs, AP12 320 and AP13 330, may verify the receipt of the packet by the MU 380. Therefore, after an initial transmission of the packet from the AP11 380, the MU 380 may successfully receive the packet without the ability to acknowledge receipt to the AP11 380. Since the present invention may forward the unverified packet to each of the neighboring APs, one of these neighboring APs may be able to receive the acknowledgement message from the MU 380 during a further transmission of the forwarded packet. Thus, the delivery of the unverified packet may be verified if the MU 380 roams beyond coverage area of the AP11 380. As opposed to having AP11 380 retransmit the packet several times without verification, the neighboring AP may confirm receipt once the MU 380 enters the coverage area of that neighboring AP.

According to the preferred embodiment of the present invention, the forwarding process for retransmitting the undeliverable packet may terminate at the immediate neighbors of the AP11 380. In other words, after repeated transmission from the AP11 380 to the MU 380, a packet that is undeliverable may be forwarded to the AP12 320 and the AP13 330. The packet may then be repeatedly transmitted from these neighboring APs. However, if the packet is undeliverable from the AP12 320 and the AP13 330, the packet may finally be dropped. This may prevent this embodiment of the present invention from perpetually retransmitting the packet throughout an entire network when a packet is truly undeliverable (e.g., the MU 380 has been turned off, the MU 380 is in a undeliverable location such as a basement, elevator, etc.). However, it is important to note that the present invention may optionally allow for multiple retransmission of the packet from second and third neighbors of the initial AP. Thus, an alternate embodiment of the present invention may terminate the retransmissions of the packet after the neighbors of both the AP12 320 and the AP13 330 fail to receive acknowledgement from the MU 380.

While an exemplary embodiment of the present invention describes the system and method within a wireless networking infrastructure, those skilled in the art will understand that the principles and functionality described herein may be implemented in a software program, a component within a software program, a hardware component, or any combination thereof.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method for loss-less roaming, comprising:
 transmitting a stream of voice packets from a first access point ("AP") to a mobile unit ("MU") within a coverage range of the first AP;
 the MU roaming beyond the range of the coverage area of the first AP preventing a voice packet from being transmitted from the first AP to the MU rendering this voice packet undelivered;
 retransmitting the undelivered voice packet from the first AP to the MU a predetermined number of times without receiving an acknowledgement from the MU;
 forwarding multiple copies of the undelivered voice packet, along with an encryption key distinct to the first AP, from the first AP to a plurality of neighboring access points each having their own distinct encryption key; and
 each of the neighboring APs transmitting its copy of the undelivered voice packet, along with the encryption key distinct to the first AP, for the MU, wherein the MU is able to receive and decrypt the copy of the voice packet using the encryption key distinct to the first AP.

2. The method according to claim 1, wherein forwarding includes forwarding the undelivered voice packet and encryption key via a wireless switch to the neighboring APs.

3. The method according to claim 1, wherein forwarding includes broadcasting each copy the undelivered voice packet and encryption key in a direct communication from the first AP to the second AP.

4. The method according to claim 1, further comprising:
 retransmitting the copy of the voice packet and encryption key from each neighboring APs a predetermined number of times when acknowledgement of receipt of the voice packet is not received from the MU by that neighboring AP, whereinafter
 dropping the copy of the voice packet.

5. A system for loss-less roaming, comprising:
 a mobile unit ("MU") that can roam within the system;
 a plurality of neighboring access points within the system; and
 a first access point ("AP") operable to transmit a stream of voice packets to the MU within a coverage range of the first AP, wherein
 the MU operable to roam beyond the range of the coverage area of the first AP preventing a voice packet from being transmitted from the first AP to the MU rendering this voice packet undelivered; whereupon
 the first AP retransmits the undelivered voice packet from the first AP to the MU a predetermined number of times without receiving an acknowledgement from the MU; whereupon
 the first AP forwards multiple copies of the undelivered voice packet, along with an encryption key distinct to the first AP, to the plurality of neighboring access points each having their own distinct encryption key, each neighboring access point transmits its copy of the undelivered voice packet, along with the encryption key distinct to the first AP, for the MU, wherein the MU is able to receive and decrypt the copy of the voice packet using the encryption key distinct to the first AP.

6. A device for loss-less roaming, comprising:

a receiving module for receiving a stream of voice packets;

a transmission module for transmitting the stream of voice packets from the device to a mobile unit ("MU") within a coverage range of the device, wherein if the MU roams beyond the range of the coverage area of the device preventing a voice packet from being transmitted from the device to the MU rendering this voice packet undelivered, the transmission module retransmitting the undelivered voice packet to the MU a predetermined number of times without receiving an acknowledgement from the MU; and a forwarding module for forwarding multiple copies of the undelivered voice packet, along with an encryption key distinct to the device, from the device to a plurality of neighboring devices each having their own distinct encryption key, each neighboring device will transmit its copy of the undelivered voice packet, along with the encryption key distinct to the device, for the MU, wherein the MU is able to receive and decrypt the copy of the voice packet using the encryption key distinct to the device.

* * * * *

UNITED STATES PATENT AND TRADEMARK OFFICE
CERTIFICATE OF CORRECTION

| | | |
|---|---|---|
| PATENT NO. | : 7,826,425 B2 | Page 1 of 1 |
| APPLICATION NO. | : 11/495448 | |
| DATED | : November 2, 2010 | |
| INVENTOR(S) | : Sekhar | |

It is certified that error appears in the above-identified patent and that said Letters Patent is hereby corrected as shown below:

In Column 1, Line 10, delete "BACKGROUNDS" and insert -- BACKGROUND --, therefor.

In Column 1, Line 59, delete "voice," and insert -- voice --, therefor.

In Column 6, Line 58, delete "AP 11" and insert -- AP11 --, therefor.

In Column 6, Lines 63, delete "330 the" and insert -- 330. The --, therefor.

Signed and Sealed this
First Day of May, 2012

David J. Kappos
*Director of the United States Patent and Trademark Office*